United States Patent
Hellenbrand

(10) Patent No.: US 10,059,478 B2
(45) Date of Patent: Aug. 28, 2018

(54) METHOD AND DEVICE FOR DIVIDING A BLISTER STRIP

(71) Applicant: Becton Dickinson Rowa Germany GmbH, Kaifenheim (DE)

(72) Inventor: Christoph Hellenbrand, Kelberg (DE)

(73) Assignee: Becton Dickinson Rowa Germany GmbH, Kaifenheim (DE)

( * ) Notice: Subject to any disclaimer, the term of this patent is extended or adjusted under 35 U.S.C. 154(b) by 0 days.

(21) Appl. No.: 15/171,676

(22) Filed: Jun. 2, 2016

(65) Prior Publication Data
US 2017/0349314 A1    Dec. 7, 2017

(51) Int. Cl.
| B65B 61/04 | (2006.01) |
| B65B 61/06 | (2006.01) |
| G01B 11/24 | (2006.01) |
| H04N 13/02 | (2006.01) |

(52) U.S. Cl.
CPC .............. *B65B 61/04* (2013.01); *B65B 61/06* (2013.01); *B65B 61/065* (2013.01); *G01B 11/24* (2013.01); *H04N 13/0232* (2013.01)

(58) Field of Classification Search
CPC ......... B26D 5/007; B65B 61/04; B65B 61/06; B65B 61/065; B65B 61/10; B65B 61/12; G06T 2207/30108; G06T 7/0004; G06T 2207/10012; G06T 7/50; G06T 7/521; G06T 7/55; G06T 7/593; H04N 13/0232; G01B 11/24
USPC .................................................. 382/143, 154
See application file for complete search history.

(56) References Cited

U.S. PATENT DOCUMENTS

| 6,166,811 A * | 12/2000 | Long ....................... G01S 17/42 356/602 |
| 6,945,017 B1 * | 9/2005 | Bonney ............... B29C 65/1635 206/484 |
| 9,610,219 B1 * | 4/2017 | Basso .................. B26D 7/0675 |
| 2006/0288833 A1 * | 12/2006 | Lachance ........... A22C 17/0006 83/76.6 |
| 2011/0132163 A1 * | 6/2011 | Deutsch ................. B26D 5/007 83/78 |

(Continued)

FOREIGN PATENT DOCUMENTS

| DE | 4208563 A1 * | 9/1993 | ............. B26F 3/004 |
| EP | 2 025 601 A2 | 2/2009 | |

(Continued)

OTHER PUBLICATIONS

European Search Report issued in corresponding EP Application No. 16172594 dated Nov. 23, 2016 (6 pages).

*Primary Examiner* — Geoffrey E Summers
(74) *Attorney, Agent, or Firm* — McDermott Will & Emery LLP

(57) ABSTRACT

A method for dividing a blister strip having a plurality of blister-packaged drugs apportioned into separate sections of the blister strip is provided. A blister strip with a substrate having a plurality of depressions for drug portions is provided and an image of the substrate is generated by a 3D-sensor device, the image including depth information. A control device evaluates the image with image analysis. Based on the analysis results, an arrangement of the depressions is determined and control signals for a separating device are generated. The blister strip is then divided into a plurality of blister strip parts based on the control signals.

19 Claims, 5 Drawing Sheets

(56) References Cited

U.S. PATENT DOCUMENTS

| | | | | |
|---|---|---|---|---|
| 2013/0133489 A1* | 5/2013 | Este | .................. | B26D 5/007 83/13 |
| 2014/0013717 A1* | 1/2014 | Monti | .................. | B29C 66/80 53/477 |
| 2016/0158952 A1* | 6/2016 | Este | .................. | B65B 57/02 83/13 |

FOREIGN PATENT DOCUMENTS

| | | |
|---|---|---|
| EP | 2 301 850 A1 | 3/2011 |
| KR | 10 2015 0062065 A | 6/2015 |
| WO | 2015011631 A1 | 1/2015 |

* cited by examiner

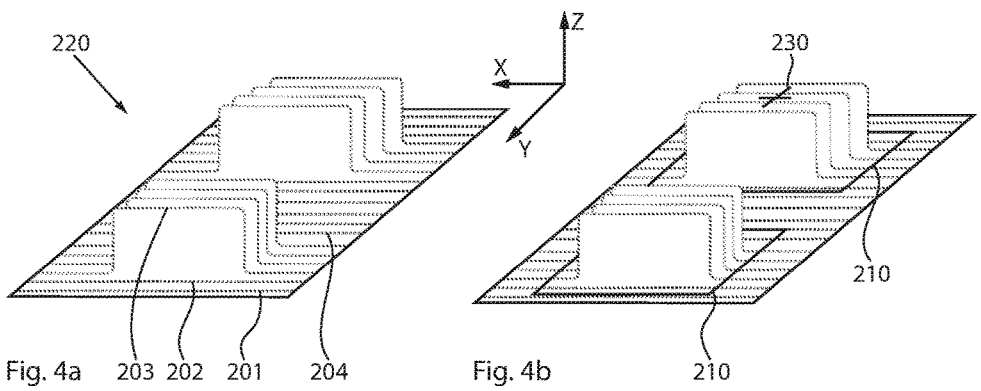
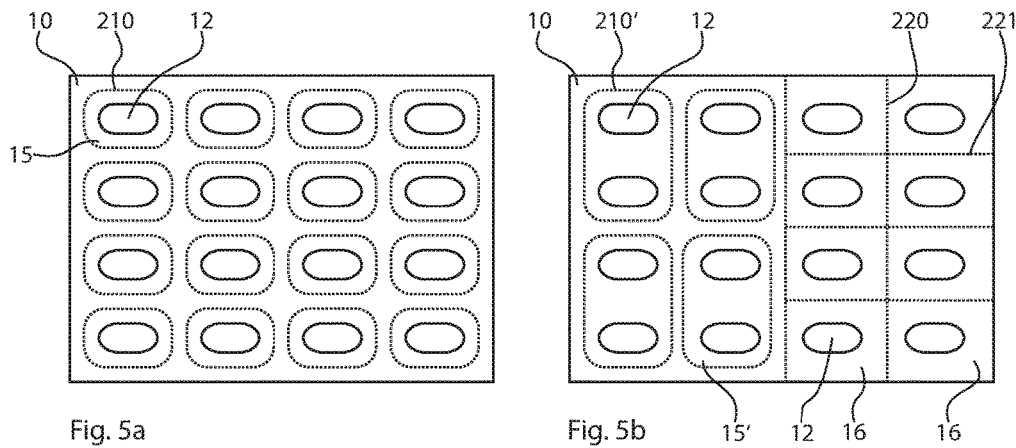
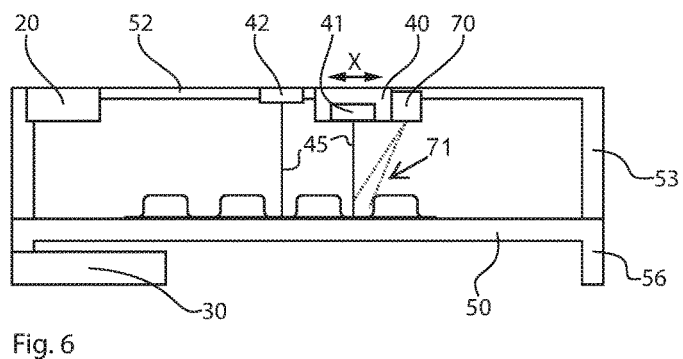

METHOD AND DEVICE FOR DIVIDING A BLISTER STRIP

BACKGROUND

The present disclosure relates to dividing a blister strip, and in particular automatically dividing a blister strip into separated blister parts containing drug portions.

The blister-packaging of drugs individualized for each patient according to medical prescriptions is in particular expedient for retirement and nursing homes and for hospitals. A manual assembly and blister-packaging of drug portions is, however, very cost-intensive and some automated blister packaging machines, as they are described, for example, in the publication WO 2013/034504, are increasingly used. Appropriate automated blister packaging machines enable a high-quality, secure and, at the same time, economical blister-packaging of solid drug portions. When blister-packaging with the aid of a previously mentioned automated blister packaging machine, the drug portions are packaged into individual pouches which routinely include all drug portions of a patient at one consumption time.

It is desirable to provide a method and a device by which blister strips can be quickly and cost-effectively divided.

SUMMARY

One or more disclosed embodiments provide a method for dividing a blister strip. The method includes receiving a blister strip, the blister strip including a substrate having a plurality of depressions for drug portions and a cover layer for covering the plurality of depressions. The method also includes generating, by a 3D sensor device, an image of the substrate having the plurality of depressions, the image comprising depth information. The method further includes evaluating, by a control device using image analysis, the image and determining, by the control device, an arrangement of the plurality of depressions based on the evaluation of the image. The method also includes calculating control signals based on the arrangement of the plurality of depressions and dividing, by a separating device having at least one separator, the blister strip into a plurality of blister strip parts based on the control signals.

One or more disclosed embodiments provide a blister strip dividing device including a 3D-sensor device configured to generate an image of a blister strip having a substrate and a plurality of depressions, wherein the image comprises depth information. The blister strip dividing device also includes a separating device having at least one separator for dividing the blister strip into a plurality of blister strip parts and a control device coupled to the 3D-sensor device and the separating device. The control device is configured to evaluate the generated image by image analysis, determine an arrangement of the plurality of depressions in the substrate of the blister strip based on the evaluation, and calculate control signals for the separating device based on the determined arrangement of the plurality of depressions. The blister strip is divided into a plurality of blister strip parts by the separating device based on the calculated control signals.

One or more disclosed embodiments provide a method for dividing packaged drugs. The method includes generating, by a 3D sensor device, an image of a substrate of a drug package, the substrate including a plurality of depressions each configured to hold one or more drug portions, the image having depth information. The method further includes evaluating, by a control device, the image, the control device configured to use image analysis and determining, by the control device, an arrangement of one or more of the plurality of depressions based on the evaluation of the image. The method also includes calculating one or more control signals based on the determined arrangement and dividing, by a separating device, the drug package into a plurality of drug package parts based on the one or more control signals.

BRIEF DESCRIPTION OF THE DRAWINGS

The device according to the present disclosure and the method according to the present disclosure are described in greater detail below, with reference to the appended drawings wherein:

FIG. 1b is a top plan view of the blister strip of FIG. 1a;

FIG. 2b is a front elevation view of the device of FIG. 2a;

FIGS. 4a and 4b illustrate analysis results of processing an image of a blister strip using image analysis;

FIG. 5a is a top plan view of the blister strip of FIG. 1b having indicated cutting lines;

FIG. 5b is a top plan view of the blister strip of FIG. 1b having different indicated cutting lines;

FIG. 6 is a front elevation view of one or more embodiments of a device for dividing blister strips;

DETAILED DESCRIPTION

Figure 1A:
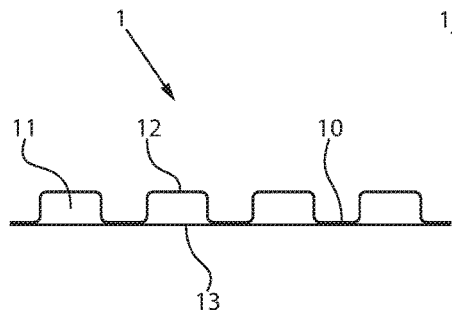
FIG. 1a is a front elevation view of a blister strip.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

A plurality of drugs are distributed in drug packages or blister strips (e.g., press-through packages, blister packs). The blister strips include a substrate having multiple depressions formed from the substrate in the shape of blisters. Individual drug portions are disposed in the cavities formed by the depressions. The substrate is provided with a cover layer for covering the depressions, through which the individual drug portions may be removed or depressed for removal.

Blister strips have the advantages that the individual drug portions are stored separate from one another, a contamination is eliminated and, owing to the separate and sealed storing, the shelf life of the drugs is increased vis-à-vis storage. For example, unlike in conventional containers or bottles, even if a blister strip has been opened, meaning that one or a plurality of drug portions has/have been removed, the shelf life of the remaining, still blister-packaged drug portions is not changed.

In order to be able to blister-package a large variety of different drug portions in an automated manner, modern automated blister packaging machines typically have a variety of canisters in which individual drug portions are stored and with which the drug portions can, according to the specifications of the drug compositions, be individually dispensed.

The canisters, however, only expediently store such drug portions that are frequently requested, have a long shelf life, and are relatively resistant against environmental influences. A distribution of drug portions to be stored in blister strips is usually not possible or practicable via the canisters.

The typical automated blister packaging machines routinely include at least a tray unit via which drug portions can be supplied in special shapes or in separate packaging to the blister-packaging process. Accordingly, a user typically manually divides the blister strips into one or a plurality of blister strip sections or parts of drug portions which are then passed to the respective depressions of the tray unit. The manual division of a blistering strip is time-consuming and thus cost-intensive.

Alternatively, the individual blister strip parts can also be used to provide individual compositions for each patient according to single-dose system. For this purpose, one or a plurality of blister strips parts is/are packaged into, for example, a transportation pouch. The transportation pouch may include information related to the drugs.

The method of the present disclosure first provides a blister strip having a substrate which has a plurality of depressions for drug portions, and having a cover layer for covering the depressions. A three dimensional (3D) sensor device generates an image of the substrate having the depressions, the image having depth information.

Subsequently, a control device evaluates the image by image analysis. A type of depth map of the surface of the blister strip may be created, and on the basis of the results of the analysis, an arrangement of the depressions may be determined. For example, it may be determined where the depressions are precisely located on the substrate. This information required for the automatic dividing of the blister strips is not provided at the onset of the method and is determined by the described method.

In one or more embodiments, if an absolute position of the depression is required, the position may be determined on the basis of a reference point, and the reference point may be specified via the 3D-sensor device. In one or more embodiments, before creating the image, the blister strip may be positioned at a reference point. Further possibilities for determining an absolute position result from the precise method of proceeding and from the structure of the device used for carrying out the method are described below. In one or more embodiments, the 3D-sensor device used for generating the image in reference to the rest surface onto which the blister strips are deposited may be calibrated.

Based on the arrangement of the depressions determined by image analysis, control signals may be calculated for a separating device having at least one separator. The blister strip may be divided into a plurality of blister strip parts based on these control signals.

The method according to the present disclosure may be carried out in a fully automated manner independently from the specific embodiment or configuration of the blister strip, because it is determined during the course of the method of the present disclosure in which areas of the blister strip the depressions are situated. Based on the arrangement of the depressions, the control signals for a separating device may be calculated in such a manner that the depressions are not damaged during the cutting or division of the blister strips. Thus, the control signals provide separating instructions for the separating device, the exact configuration and embodiment of the control signals being dependent on the type of separating device, which will later be set out in more detail.

As already mentioned, owing to the fully automated execution, the method according to the present disclosure is substantially faster than dividing the blister strips manually. As a function of the separating device or separator, it is furthermore provided to remove the individual blister strip parts from the blister strip in such a manner that the shape of the provided blister strip parts is better suited for blister-packaging. For example, the individual blister strip parts may be removed in such a manner that no corners are present.

It is not substantial for the purposes of the method which type of 3D-sensor device is specifically used, as long as generating the image includes depth information allowing to conclude the arrangement of the depressions on the blister strips. For example, a 3D-camera may be used as the 3D-sensor device. 3D-cameras are camera systems enabling image representation of distances of a complete scene. Several types of 3D-cameras may be used.

For example, stereo cameras that simultaneously record surroundings with two cameras, the distance of the camera lenses usually corresponding to the distance of the human eye. The resulting image pair may be processed in a processor of a control device and a depth map may be generated.

As another example, triangulation systems may be used in which a light source projects a defined pattern onto the subject. A camera may record this pattern from a different viewing angle and then calculate the distance or a depth map from the distortion.

Time of flight (TOF) cameras may be used to conclude the distance from propagation time measurement of the light. As another example, interferometric systems use interferences between a measuring and an object beam.

Light-field cameras may also be used, though at the expense of the resolution and the brightness of an image point. Here, the direction of light of the beams leading up to an image point is recorded with the aid of micro-lens arrays and then a depth map can be calculated from this data.

In one or more embodiments, 3D-laser rangefinders may be used, though the use of a 3D-camera system may be preferable because of the lower cost.

It is to be noted that the term "3D sensor device" as it is here used, is to be primarily defined by the result, that is, the generated image which must comprise the depth information, on the basis of which the position or arrangement of the depressions can be determined. Thus, the term 3D-sensor device includes all optic devices which may generate an image having depth information and that is independent of whether this depth information is immanently present in the image or, if applicable, whether the depth information has to be determined by the aid of a control device. Thus, the term 3D-sensor may include conventional digital cameras, the images of which are subjected to image processing to determine the required depth information.

The image generated by the 3D-sensor device may be evaluated using image analysis by the control device. Based on the results of the analysis, the arrangement of the depressions may be determined and control signals for the separating device may be generated based on this arrangement. The control signals are typically generated under firm specifications. For example, it may be provided that the control signals are always generated in such a manner that a certain safety distance to the depressions is ensured. For example, a distance of 2 mm to a defined height of the depression may always be maintained, and this defined height may be 5% of the maximum height or the like. Furthermore, it may be specified that the control signals are calculated so that the blister strips are always separated in such a manner that the individual parts each have only one depression.

The configuration of the depressions for the drug portions can vary from one blister strip to another and also for the same type of drug. In one or more embodiments, it is provided that the control signals are calculated by taking into account the separating specifications. These separating specifications may be printed onto the blister strip and retrieved by a suitable sensor. In one or more embodiments, the separating specifications may also be generated on the basis of the depth information or the depth map. In this way, it may be necessary or advantageous to provide, when calculating the control signals, a greater safety distance for depressions rising in a relatively flat manner to the center than what would be required for depressions having very steep side walls.

Separating specifications for one or a plurality of blister strips may be specified by a user. For example, a user may specify that not only one depression, but a plurality of depressions, are provided per blister strip part.

The control signals may be adapted to a desired geometry of the blister strip parts. If only one single blister strip part is to be blister-packaged, the geometry of this part is not relevant with regard to potentially damaging further drug portions to be blister-packaged. In this instance, only the risk of compromising the blister pack itself would be relevant. In case that the blister strip part is, however, blister-packaged together with other drug portions which are not blister-packaged as single units, sharp corners are to be avoided so that it can, for example, be indicated as a separating specification that the blister strip parts are removed without corners from the blister strip.

In one or more embodiments, the blister strip may be divided, based on the control signals, into a plurality of blister strip parts during the last method step. As a function of the size of the blister strips, it may become necessary to provide a plurality of separators in the separating device to be able to reach all areas of the blister strips. In order to avoid having a plurality of separators, the blister strip and the at least one separator may be moved relative to each other when dividing the blister strips. For example, the separator may be moved when the blister strip is stationary, the blister strip may be moved when the separator is stationary, or a combination of both. This ensures that, when only one separator is used, all areas of the blister strip can be reached for the dividing process. If a very quick processing is required, using only one separator may be too slow. Thus, the separating device may include multiple separators that are operated in a parallel manner.

An image of the substrate having the depressions may be generated by the 3D-sensor device. In order to keep the costs for the 3D-sensor device in line, a 3D-sensor device having only a limited resolution may be used. The limiting of the resolution of the 3D-sensor device may result the resolution not being suitable or capable of generating an image of the complete blister strip by one recording. For this reason, when generating the image, a plurality of sub-images may be generated which together form the image. In this manner, cost-efficient 3D-sensor devices having only limited resolution may be used.

During use of the separator or the separating device, a heat transfer to the substrate of the blister strip can occur when dividing the blister strip (e.g., when using a laser separating device). For this reason, a cooling fluid may be applied to the blister strip during dividing. In this way, the heat introduced during dividing can be quickly discharged to prevent compromising of heat-sensitive drug portions.

In one or more embodiments, a device for dividing a blister strip may include a 3D-sensor device for generating an image of a blister strip, the blister strip comprising a substrate having a plurality of depressions, and the image comprising depth information of the blister strip. The device may include a separating device having at least one separator for dividing the blister strip into a plurality of blister strip parts and a control device coupled to the 3D-sensor device and the separating device. The control device may be configured in such a manner that the control device evaluates the generated image by image analysis and, based on the results of the image analysis, an arrangement of the depressions in the substrate of the blister strips may be determined. Also, based on the arrangement of the depressions, control signals for the separating device may be calculated, on the basis of which the blister strip may be divided into multiple blister strip parts.

The device may include a movement device which causes a relative movement between the at least one separator and the blister strip. A device configured in such a manner may be used to process blister strips of any size. Furthermore, a device having only one separator may also be used for processing large blister strips. With regard to the relative movement between the at least one separator and the blister strip, it is provided for a device configured in a structurally particularly simple manner that the at least one separator is moveably attached to a slide, which itself is movable vertically to the separator. In this manner, a kind of X-Y table is created on which the separator is movable so that a processing of a blister strip is possible in any shape and size.

Dividing the blister strips themselves can, for example, be carried out by a laser separating device, which introduces a certain heat quantity into the substrate of the blister strip when dividing by a laser beam. In order to prevent the introduced heat damaging the drug portions disposed in the depressions, a cooling device is provided by which a cooling fluid may be applied to the blister strips.

The exact configuration of the separating device is not decisive for the present disclosure. It is only to be ensured that the separating device can divide the blister strip into a plurality of blister strip parts. "Dividing" in this case also meaning that a plurality of blister strip parts are cut out from the blister strip itself and a frame structure remains from which all depressions, including the surrounding substrate, have been removed.

The separating device may be a laser cutting device, a water jet cutting device or a punching device, for example. A cutting device having at least one knife or the like may also be used. As a function of the used separating device, a fixing device may be provided for fixating the blister strip onto the rest.

In case that a laser cutting device or a water jet cutting device is used, the laser beam or the water jet traces a calculated cutting curve or cutting line, the cutting curve or cutting line being specified by the control signals. Based on the control signals, the separating device (e.g., laser cutting device or water jet cutting device) or a corresponding separator may be moved in such a manner that a suitable cutting curve or cutting line is traced by the actual separator. Thus when tracing the cutting line or curve, the actual dividing of the blister strips is carried out. As discussed above, the blister strip may also be moved during the cutting process.

When using a punching device, the control signals do not specify a cutting line or curve, but only coordinates for which a depression including the surrounding substrate is to be punched.

Since the depressions are routinely space-optimized and adapted to the shape of the deposited drug portions, the punching device may include multiple punches useable as a function of the determined control signals. The different punches may have different radii and shapes so that a suitable punch may be selected as a function of the shape and the size of the depressions, which provide the basis for determining the control signals.

Figure 1B:
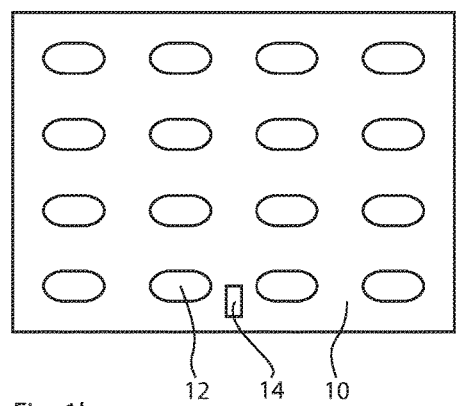

Turning to FIGS. 1a and 1b, a blister strip 1 having a substrate 10 having a plurality of depressions 12 is provided. The substrate 10 and the depressions 12 are provided with a cover layer 13 covering cavities 11 formed by the depressions 12. Generally, here not-shown drug portions are disposed in cavities 11. The blister strip 1 is a conventional embodiment of a blister strip or blister pack.

As shown in FIG. 1b, information 14 is applied to the lower section of the substrate 10, the information 14 being detectable by an appropriate laser device. For example, the information 14 may include advice regarding the distribution of the depressions 12 on the substrate 10, information regarding the drug portions in the depressions 12, or information regarding the configuration of the depressions 12 themselves (e.g., whether the side walls are configured in a rather flat or steep manner).

In blister strip 1, depressions 12 are arranged into a type of matrix. In other embodiments of a blister strip, the depressions 12 may be arranged in the shape of an oval or the like.

Figure 2A:
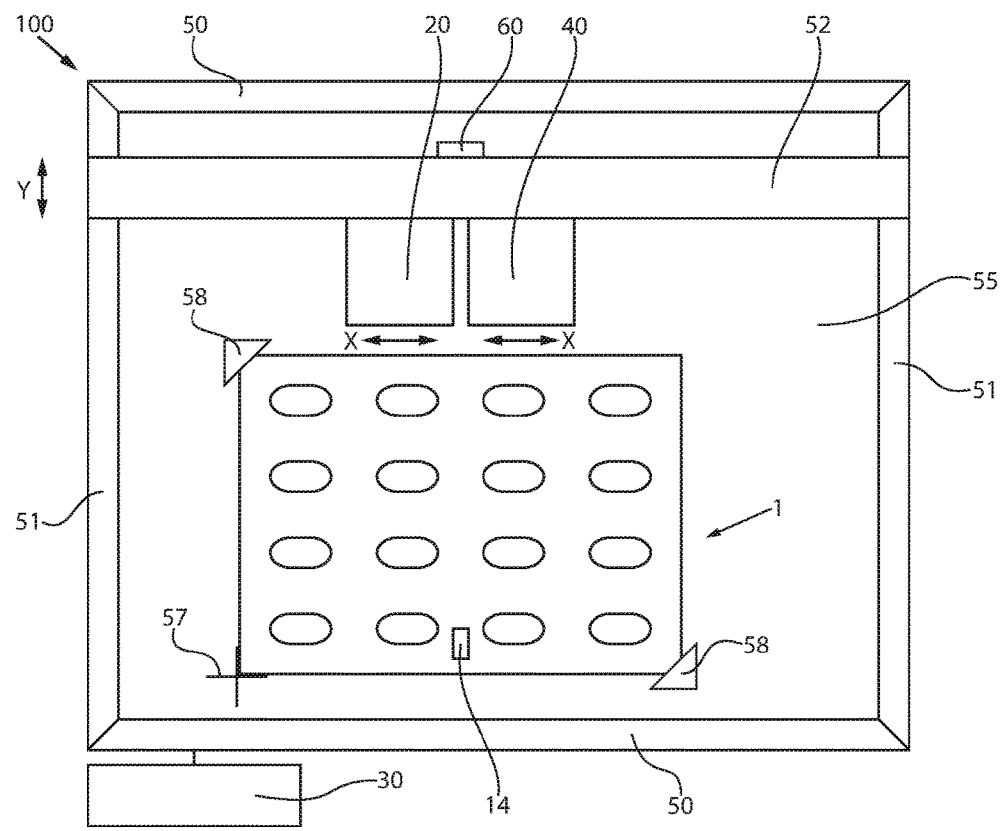
FIG. 2a is a top plan view of one or more embodiments of a device for dividing blister strips.

Turning to FIG. 2a, a device 100 for dividing blister strips is provided. The device 100 includes a rectangular support structure formed by support elements 50, 51 arranged on legs 56 (see FIG. 2b). Support elements 50, 51 together with legs 56 form a type of table having a rest 55. Two lateral (vertically shown) support elements 51 are spanned by a slide 52 vertically movable as indicated by the arrow denoted by Y (see FIG. 2a). The mechanics required for moving the slide 52 are omitted to not unnecessarily complicate the illustration.

Slide 52 is connected to a control device 30, which emits control signals for moving the slide 52 in the Y-direction. A 3D-sensor device 20, a separating device 40 and a sensor 60 are attached to slide 52, all of which can be coupled to control device 30 via communication lines (not-shown). Here, 3D-sensor device 20 and separating device 40 are movable (e.g., orthogonally movable to moving direction Y of the slide 52) at the slide 52 in the X-direction. A drug pack or blister strip 1 is mounted onto rest 55 and is aligned with a position sensor 57. The blister strip 1 is fixated onto the rest 55 itself by a fixing device 58, a corresponding fixing being particularly used for such separating devices which exert a force onto the substrate 10 and, in this way, can cause a movement of the blister strip 1. As a function of the exact configuration of the fixing device 58, a plurality of fixing devices 58 may be used. The function of the positioning sensor 57 may also be taken over by fixing device 58, meaning the positioning and the fixing are both carried out by one and the same component.

Figure 2B:
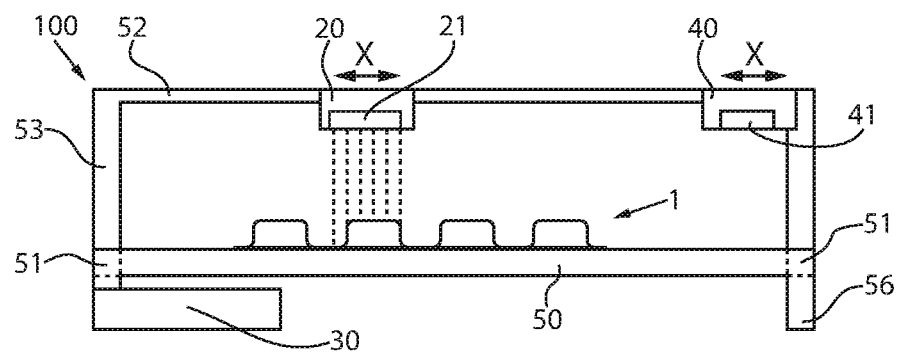

In FIG. 2b, the configuration of slide 52 can be seen, which is movable on lateral support element 51 by two legs 53. Separating device 40 having a separator 41, is shown in FIG. 2b as being moved to the right edge of the slide 52. This enables scanning the blister strip 1 mounted onto rest 55 by the 3D-sensor device in the X-direction to enable generating an image of the blister strip 1. In the shown embodiment, it is necessary, owing to the configuration of the 3D-sensor device 20, to scan the blister strip 1 because the actual 3D-sensor 21 of the 3D-sensor device 20 is configured in such a manner that only a section of the blister strip 1 can be detected. In other embodiments, a 3D-sensor device having, for example, a greater 3D-sensor or a plurality of 3D-sensors may be used, as a result of which scanning the blister strip 1 can be avoided.

As shown in FIGS. 2a and 2b, the movement of the slide 52, of the separating device 40, and of the 3D-sensor device 20 cause a relative movement between the blister strip 1 and the previously mentioned components. As described, the process of generating an image of the blister strips 1, in a suitable embodiment of the 3D-sensor device 20, may also be carried out without a relative movement between the blister strip 1 and the 3D-sensor device 20.

Figure 3:
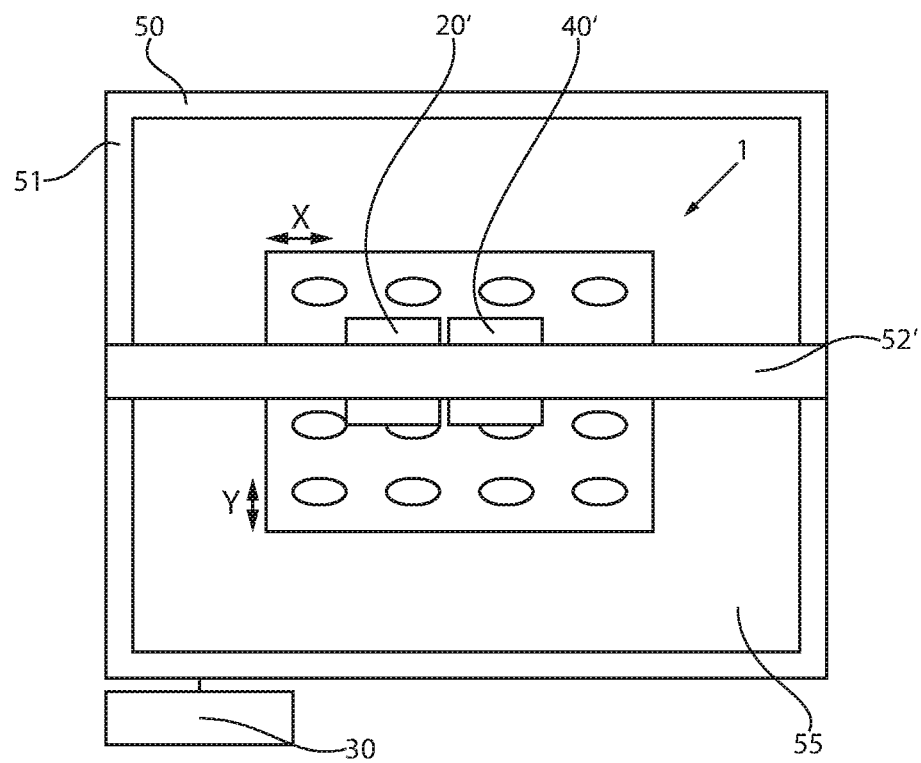
FIG. 3 is a top plan view of one or more embodiments of a device for dividing blister strips.

As shown in FIG. 3, the blister strips 1 may be moveable under a non-movable 3D-sensor device 20' or a non-movable separating device 40', as it is indicated by movement arrows X, Y. The mechanics necessary for moving the blister strips 1 is not illustrated, however it may be configured similarly to slide 52 (e.g., slide 52'). Depending on the exact structural configuration of the 3D-sensor device 20' and/or the separation device 40', it may suffice that the blister strip 1 is only moved into one direction (e.g., along its longitudinal axis in the X-direction).

For example, a blister strip 1 on a rest 55 of a device as described, for example, in FIGS. 2a and 2b may first be provided. Following thereupon, a 3D-sensor device 20' or a sensor of the 3D-sensor device 20' generates an image of the blister strip 1 comprising depth information. For this purpose, it is of course substantial that the blister strip 1 having the depressions 12 is aligned with the 3D-sensor device 20'.

Turning to FIG. 4a, a section of the image 220 generated by the 3D-sensor device 20, 20' having a plurality of lines 201, 202, 203, 204, etc. of the image 220 is shown in a simplified manner. As shown, the image 220 already includes depth information (e.g., in the Z-direction), as can be seen from the difference between lines 202 and 203.

The precise information content of an image generated by a 3D-sensor device is a function of the used recording method. In some of the methods discussed above, the depth information is already immanently included in the image itself, meaning it is not necessary to further process the image to reveal the depth information. In other recording methods, it can be potentially necessary to process the information detected by the 3D-sensor device to generate an image using depth information (e.g., if a stereo camera is used).

Following the generation of the image by the depth information, a control device evaluates the image by image analysis with regard to the position and configuration of the depressions in the substrate. When evaluating by image analysis, it is determined where the depressions are individually situated and which dimensions the depressions comprise, and this information can be detected on the basis of the depth information.

Based on the arrangement and dimensions of the depressions, the control signals for a separating device are then calculated and, subsequently thereto, the blister strip having the separating device, or having a separator of the separating device, is divided into a plurality of blister strip parts on the basis of the generated control signals, the blister strip to be optionally fixated on the rest by corresponding fixing devices. The control signals themselves are a function of the type of separator that is used to divide the blister strip.

First, this will be described on the basis of a laser separating device. A laser separating device comprises at least one laser separator emitting a laser beam via specific optics, by which the substrate together with the cover layer may be, at an appropriate output, cut up. For this purpose, the laser beam is to trace a specified cutting curve or cutting line, the cutting curves or lines to be traced being determined on the basis of the separating specifications.

In FIG. 4b, two such cutting curves 210 are illustrated. The control signals are, as a function of the precise configuration of the used device, calculated in such a manner that the laser beam can trace cutting curve 210. For this purpose, the control signals comprise signals for a slide to be moved in the Y-direction and/or a separating device to be moved in the X-direction. In other embodiments, the control signals may comprise signals for moving the blister strips themselves.

The exact configuration or the precise structure of the control signals are, thus, also a function of the exact structural configuration of a device by which the blister strip is divided.

When using a laser separating device, the laser may be controlled by a plurality of mirror arrangements (not shown) to trace the cutting curves or cutting lines. The control signals then could also affect a movement or adjustment of the mirrors.

The control signals may also be a function of the separating specifications. As shown in FIG. 5a, it is indicated that each depression 12 is individually removed from the blister strip 1. For this purpose, control signals are determined for a plurality of cutting curves 210 surrounding individual depressions 12. According to the cutting curves 210, multiple blister strip parts 15 are removed from substrate 10.

As shown in FIG. 5b, it is indicated on the left side that each blister strip part 15' comprises two depressions 12. Cutting curves 210' and the control signals are correspondingly adapted. As shown on the left side of FIGS. 5a and 5b, blister strip parts 15, 15' can be removed from the blister strips 1. In one or more embodiments, it can be provided to divide the blister strips 1 into a number of blister strip parts 16. This is indicated in FIG. 5b on the right side. The control signals specify cutting curves in the form of cutting lines 220, 221, according to which some or all of the blister strip is divided into blister strip parts 16. The blister strip 1 may be divided into a combination of different blister strip parts (e.g., blister strip parts 15' and blister strip parts 16 as shown on FIG. 5b).

In one or more embodiments, a blister strip 1 may be divided by a water jet separating device. In this example, cutting curves or lines are traced by an actual separating jet of water.

When using a punching device, the control signals are determined in a different manner because a cutting curve is not to be traced by a punching device, but only a coordinate for positioning the punching device or the punch of the punching device is to be determined. For example, in FIG. 4b a respective coordinate 230 is indicated. The coordinates for the punching device may also be determined on the basis of the arrangement and the size of the depressions. As a function of the size/shape of the depressions, a specific punch may then be selected.

As shown in FIG. 6, separating device 40 includes first and a second separators 41, 42, both of which are here configured as laser separators. FIG. 6 shows the device after generating the image, evaluating the image by image analysis and determining the control signals. Thus, dividing the blister strip 1 is done by two laser beams 45 generated by laser separators 41, 42.

Here, the two laser separators 41, 42 are movable in the X-direction at slide 52. In order to ensure sufficient space for a method of the laser separators 41, 42, in this stage of the method, 3D-sensor device 20 is to be completely moved to the left. The device also includes a cooling device 70, which is attached to separating device 40, thus cooling the blister strips 1 with coolant 71. Second laser separator 42 may also be combined with a respective cooling device (not shown).

Figure 7:
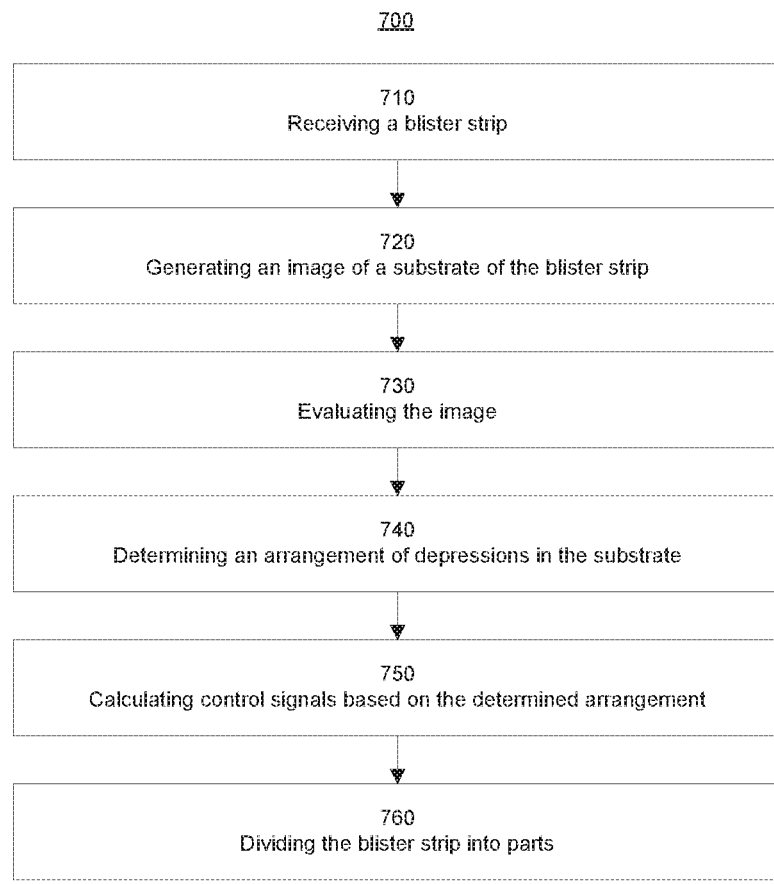
FIG. 7 is a flow chart illustrating steps in one or more embodiments of a method for dividing a blister strip.

FIG. 7 illustrates a method for dividing a blister strip 700. Step 710 includes receiving a blister strip where the blister strip includes a substrate having multiple depressions for drug portions and a cover layer for covering the depressions. In step 720, a three dimensional (3D) sensor device may be used for generating an image of the substrate having the plurality of depressions. Here, the image may include depth information related to the depressions. In step 730, a control device uses image analysis for evaluating the generated image. The control device is also used for determining an arrangement of the depressions based on the image evaluation, in step 740. In step 750, control signals are calculated based on the determined arrangement of depressions. A separating device having one or more separators is used for dividing the blister strip into a multiple blister strip parts based on the calculated control signals, in step 760.

Figure 8:
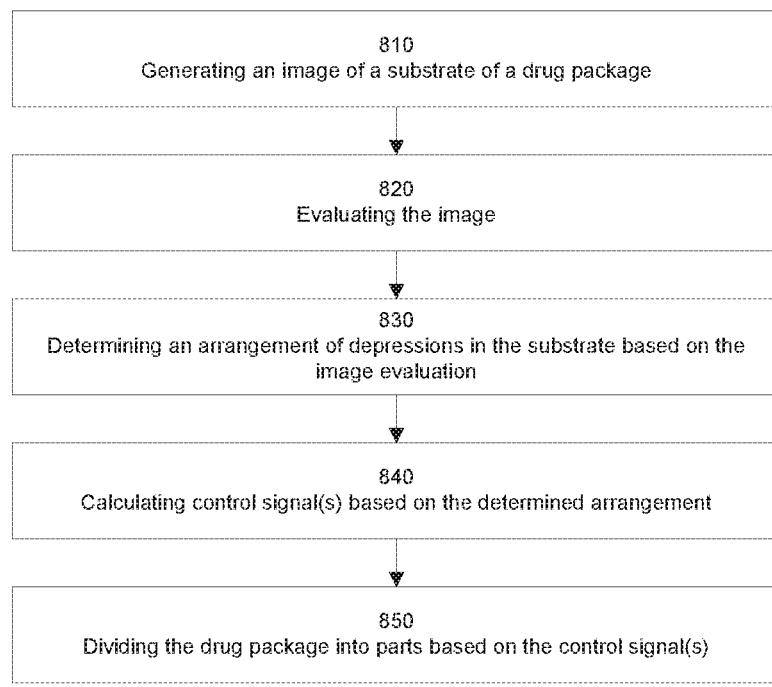
FIG. 8 is a flow chart illustrating steps in one or more embodiments of a method for dividing packaged drugs.

FIG. 8 illustrates a method for dividing a blister strip 800. Step 810 includes generating an image of a drug package substrate having multiple depressions configured to hold one or more drug portions. Here, the image may include depth information related to the depressions. In step 820, a control device using image analysis evaluates the generated image. The control device also determines an arrangement of the depressions based on the image evaluation, in step 830. In step 840, control signals are calculated based on the determined arrangement of depressions. In step 850, a separator of a separating device divides the drug package into multiple drug package parts based on the calculated control signals.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

The word "exemplary" or the term "for example" is used herein to mean "serving as an example or illustration." Any aspect or design described herein as "exemplary" or "for example" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

The invention claimed is:

1. A method for dividing a blister strip, comprising:
receiving the blister strip, the blister strip comprising a substrate having a plurality of depressions for drug portions and a cover layer for covering the plurality of depressions;
fixing the blister strip to a rest;
generating, by a 3D sensor device, an image of the substrate having the plurality of depressions, the image comprising depth information;
evaluating, by a control device using image analysis, the image;
determining, by the control device, an arrangement of the plurality of depressions based on the evaluation of the image;
calculating control signals based on the arrangement of the plurality of depressions and a safety distance to each depression, wherein the safety distance is based on a threshold depth of the depression;
moving a separating device having at least one separator, the separating device attached to a movement device; and
dividing, by the at least one separator, the blister strip into a plurality of blister strip parts based on the control signals and by moving the movement device relative to the rest.

2. The method of claim 1, wherein the control signals are calculated by taking into account separating specifications.

3. The method of claim 2, wherein the separating specifications comprise at least one of a number of depressions per blister strip part and a distance specification in relation to the depressions.

4. The method of claim 2, further comprising:
applying information to the blister strip; and
detecting the applied information by a sensor, wherein the separating specifications comprise the detected information.

5. The method of claim 1, wherein the blister strip and the at least one separator are moved in a relative manner to each other when the blister strip is divided.

6. The method of claim 1, further comprising generating a plurality of sub-images to form the image.

7. The method of claim 1, wherein the separating device comprises a plurality of separators operated in a parallel manner to divide the blister strip into the plurality of blister strip parts.

8. The method of claim 1, further comprising applying a cooling fluid when the blister strip is being divided.

9. A blister strip dividing device, comprising:
- a 3D-sensor device configured to generate an image of a blister strip having a substrate and a plurality of depressions, wherein the image comprises depth information;
- a separating device having at least one separator for dividing the blister strip into a plurality of blister strip parts;
- a slide movably attached to a support structure, the slide configured to cause a relative movement between the at least one separator and the blister strip, wherein each of the 3D-sensor device and the at least one separator is moveably attached to the slide; and
- a control device coupled to the 3D-sensor device and the separating device, the control device configured to:
  - evaluate the generated image by image analysis;
  - determine an arrangement of the plurality of depressions in the substrate of the blister strip based on the evaluation; and
  - calculate control signals for the separating device based on the determined arrangement of the plurality of depressions,
- wherein the blister strip is divided into a plurality of blister strip parts by the separating device based on the calculated control signals.

10. The blister strip dividing device of claim 9, further comprising a cooling device configured to apply a cooling fluid to the blister strip.

11. The blister strip dividing device of claim 9, wherein the separating device comprises a laser cutting device, a water jet cutting device, a punching device or a knife.

12. The blister strip dividing device of claim 9, wherein the separating device comprises a water jet cutting device.

13. The blister strip dividing device of claim 9, wherein the separating device comprises a cutting device having at least one knife.

14. The blister strip dividing device of claim 9, wherein the separating device comprises a punching device.

15. The blister strip dividing device of claim 14, wherein the punching device comprises a plurality of punches configured to be selectable by the determined control signals.

16. The blister strip dividing device of claim 9, wherein the 3D-sensor device and the at least one separator are moveable along the slide in a first direction, and wherein the slide is movable along the support structure in a second direction that is perpendicular to the first direction.

17. A method for dividing packaged drugs, comprising:
- fixing a drug package to a rest;
- generating, by a 3D sensor device, an image of a substrate of the drug package, the substrate comprising a plurality of depressions each configured to hold one or more drug portions, the image comprising depth information;
- evaluating, by a control device, the image, the control device configured to use image analysis;
- determining, by the control device, an arrangement of one or more of the plurality of depressions based on the evaluation of the image;
- calculating one or more control signals based on the determined arrangement and a safety distance for one or more of the plurality of depressions, the safety distance based on a threshold depth of the depressions;
- moving a separating device having at least one separator, the separating device movably attached to a movement device; and
- dividing, by the separating device, the drug package into a plurality of drug package parts based on the one or more control signals and by moving the movement device relative to the rest.

18. The method of claim 17, wherein the control signals are calculated based on separating specifications, the separating specifications comprising
a number of depressions per drug package part.

19. The method of claim 17, wherein the dividing the drug package comprises operating a plurality of separators in parallel to divide the drug package into the plurality of drug package parts, wherein the drug package and at least one separator are moved relatively to each other.

* * * * *